Feb. 28, 1956 M. J. MURRAY ET AL 2,736,713
METHOD OF DISPERSING INORGANIC OXIDE SOLS
Filed Sept. 2, 1952
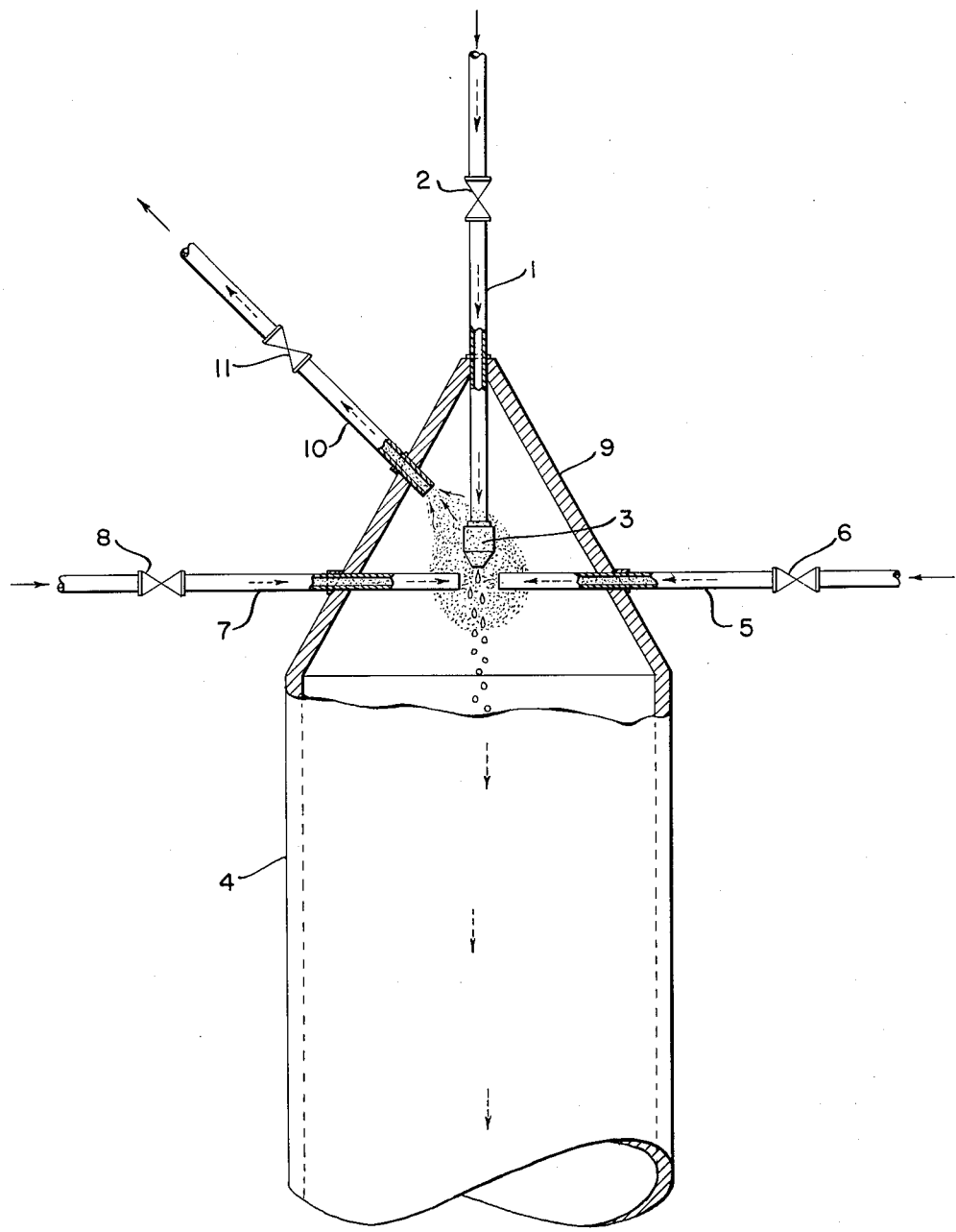
INVENTORS:
MAURICE J. MURRAY
DONALD L. HOLDEN
BY: Chester J. Giuliani
Bernard L. Kramer
ATTORNEYS:

United States Patent Office 2,736,713
Patented Feb. 28, 1956

2,736,713

METHOD OF DISPERSING INORGANIC OXIDE SOLS

Maurice J. Murray, Naperville, and Donald L. Holden, Riverside, Ill., assignors to Universal Oil Products Company, Chicago, Ill., a corporation of Delaware Application September 2, 1952, Serial No. 307,454

10 Claims. (Cl. 252—448)

This invention relates to an improved method of dispersing inorganic oxide sols in the process for forming inorganic oxide spheres.

In particular, this invention relates to a method for preventing the premature gelation of inorganic oxide sols, thereby eliminating clogging of the dispersing device used to disperse the sol.

The petroleum industry has long used catalysts to aid in converting hydrocarbons to more desirable forms. In particular, catalytic cracking of gas oils has become important and consequently methods of preparing a catalyst have become important in that cracking units ordinarily consume several tons of catalyst per day. Synthetic catalysts are prepared in a number of ways such as by separately, successively, or coprecipitating the components into any convenient shape, after which the catalyst is ground to the desired size, or in a preferred method, the catalyst is formed into spheres.

Spherical catalysts are far superior to other types in that the regular unbroken surface of each individual sphere inhibits the formation of fines and thus reduces catalyst losses in fluidized operations. Spherical catalysts are also extremely hard and therefore resist attrition which further reduces catalyst losses and also reduces erosion of plant equipment.

Generally, spherical catalyst is prepared by dispersing a pre-mixed sol as small individual particles into a gelling medium, the particles assuming a spherical shape as they descend through the gelling medium and setting to a firm gel while in transit through the gelling medium, thereafter being collected as individual firm spheroids. The gelling medium can be a hot basic gas, such as ammonia, methyl amine etc., or for basic sols a hot acid gas, such as hydrogen chloride, sulfur dioxide, carbon dioxide, etc., or a hot liquid that is substantially immiscible with the sol such as kerosene, gas oil, Nujol etc. The gel spheroids are collected in a receiver containing a hot aqueous liquid such as water in equilibrium with the gelling medium, or aqueous solutions of electrolytes such as ammonium hydroxide, ammonium carbonate, acetic acid etc. The spheroids can also be collected in a dry receiver or on a conveyer that continuously removes them from the receiver. In processes in which hot gases are used as the gelling medium, the dispersing device is by necessity maintained in the gelling medium since the gelling medium is contained in an enclosure which must be sealed in order to prevent the escape of the gelling medium. As a result of this condition it is characteristic of sphere forming processes that the dispersing device is periodically clogged with gelled sol. As the sol passes through the dispersing device some portion of the sol is retained mometarily along the stream, and, while there retained in the presence of the gelling medium, the viscosity of this portion of the sol increases, thereby preventing the sol from disengaging from the dispersing device. As a result the retained portion of the sol gels completely to a hard mass and remains on the dispersing device, eventually building up to such extent as to hamper the successful operation of the dispersing device.

It is therefore an object of this invention to prevent the premature gelation of an inorganic sol by maintaining the dispersing device in a medium that retards gelation.

In one embodiment the present invention provides for a means of maintaining an atmosphere of acid gas around a device for dispersing an acid sol into a basic gas medium, thereby preventing the premature gelation of the acid sol. Suitable acidic gel-retarding gases are sulfur dioxide, carbon dioxide and hydrogen chloride.

In another embodiment the present invention provides for maintaining an atmosphere of basic gas around a device for dispersing a basic sol into an acid gas medium, thereby retarding the gelation and preventing the premature gelation of the basic sol. Suitable basic gel-retarding gases are ammonia and methyl amine.

The gas medium around the dropping device is extremely local, thereby causing a blanketing effect which is only in the immediate vicinity of the dropping device. The introduction of this small amount of gas has no effect on the over all process since the gelation of the sol is retarded only for the very short time that the sol is in the immediate vicinity of the dropping device.

The method of this invention will be used primarily to produce a cracking catalyst for use in converting hydrocarbons from higher boiling fractions to lower boiling fractions by contacting the hydrocarbon with the catalyst of this invention at a temperature of about from 600° F. to about 1200° F. or more, and at a pressure of from atmospheric to about 1500 p. s. i. or more. Although the catalyst will be used primarily for cracking it may also be used for other reactions such as: 1. Processes known as reforming, isoforming, retreating etc. 2. Polymerization of low boiling hydrocarbons to form higher boiling hydrocarbons. 3. Alkyl transfer reactions as for example, reaction of benzene and ethyl benzene to form toluene. 4. Treating of hydrocarbon fractions to remove impurities as for example desulfurization of gasoline. These catalysts have also proved effective in reactions of organic compounds such as the dehydration of alcohols, synthesis of esters, alcohols, and acids etc.

The method of this invention will apply equally well to all of the commonly used dropping devices such as spray nozzles, rotating discs, serrated cones, etc. This method will also apply to any gelable sol such as silica sol, alumina sol, zirconia sol, magnesia sol, etc., or combinations thereof. This method further will apply to sols containing salts or other electrolytes or particles either in solution or in suspension, such as soluble salts of aluminum, magnesium, zirconium, vanadium, chromium, tantalum and others or the oxides of the metals of the above mentioned salts contained in the sol as a suspension. A typical catalyst is a silica base catalyst containing aluminum in amounts of from about 5% to about 40% made by adding aluminum sol or salt to a mixture of dilute water glass and sulfuric acid.

Our invention can best be explained with reference to the accompanying drawing which illustrates one embodiment of this invention.

Referring now to the figure, the sol is introduced into line 1 through control valve 2, whereafter it passes through spray nozzle 3, wherefrom it is dispersed as small droplets into column 4. The upper portion 9 of column 4 is laterally contracted to a conical shape so that the dropping nozzle is confined in a relatively small volume. Lines 5 and 7 disposed immediately opposite of each other entering section 9 and opening adjacent to nozzle 3 are provided for the entry of a gelation retarding gas. Valves 8 and 6 control the flow of the gelation retarding gas. As can be seen from the drawing the stream of gelation retarding gas discharging from lines 5 and 7 meet immediately below the spray nozzle, whereby creating a turbulent zone saturated with gelation retarding gases in the vicinity of the dropping nozzle. The limited volume of conical section 9 prevents the diffusion of the gellation retarding gas into the major portion of the column by reducing the quantity of gelation retarding gas required. In the upper portion of conical section 9, line 10 and the control valve 11 are provided to exhaust gelation retarding gas from the column. It is contemplated that the column shall operate at a slight positive pressure, therefore a continuous exhaust of gelation retarding gas controlled by a pressure control device will keep the gelation retarding gas in the upper section of column 4.

In a specific embodiment of the invention as applied to the manufacture of silica spheres, a silica sol is prepared by adding dilute water glass to a sulfuric acid solution. The resultant sol is passed through spray nozzle 3, emerging therefrom as finely divided particles which pass into an atmosphere of hot ammonia gas in column 4. Sulfur dioxide gas is introduced through lines 5 and 7 to maintain the space immediately surrounding nozzle 3 in an atmosphere of $SO_2$ gas, thereby preventing clogging of the spray nozzle by retarding the premature gelation of the silica sol.

The drawing is not intended to limit this invention. Many modifications of the apparatus as herein described may be made within the broad scope of this invention, as, for example, (1) the use of additional inlet conduits for gelation retarding gas, (2) other suitable shapes for the top closure of column 4 described herein as conical section 9, (3) dropping devices other than a spray nozzle, (4) the use of a hot liquid instead of a hot gaseous medium for gelation, in which case a top closure is not necessary on the column although a gas blanket around the dropping nozzle will be provided.

We claim as our invention:

1. In the manufacture of inorganic oxide spheres wherein a gelable hydrous inorganic oxide sol is dispersed in droplet form through a dispersing device in the upper portion of a gelation zone containing a gelling medium through which the sol droplets descend and set to a gel during their descent through said medium, the method of preventing premature gelation of the sol and resultant clogging of the dispersing device which comprises introducing a gel-retarding gas to the upper portion of said zone in the immediate vicinity of the dispersing device and maintaining a localized blanket of said gas around said device.

2. The method of claim 1 further characterized in that said sol and said gas are acidic.

3. The method of claim 2 further characterized in that said gas comprises sulfur dioxide.

4. The method of claim 2 further characterized in that said gas comprises carbon dioxide.

5. The method of claim 2 further characterized in that said gas comprises hydrogen chloride.

6. The method of claim 1 further characterized in that said sol and said gas are basic.

7. The method of claim 6 further characterized in that said gas comprises ammonia.

8. The method of claim 6 further characterized in that said gas comprises methyl amine.

9. In the manufacture of silica spheres wherein a silica sol is dispersed in droplet form through a dispersing device in the upper portion of a gelation zone containing an atmosphere of a basic gas in which the sol droplets set to a gel, the method of preventing premature gelation of the silica sol and resultant clogging of the dispersing device which comprises introducing an acidic gel-retarding gas to the upper portion of said zone in the immediate vicinity of the dispersing device and maintaining a localized blanket of said acidic gas around said device.

10. The method of claim 9 further characterized in that said basic gas comprises ammonia and said acidic gas comprises sulfur dioxide.

References Cited in the file of this patent

UNITED STATES PATENTS

| | | |
|---|---|---|
| 1,843,576 | McClure et al. | Feb. 2, 1932 |
| 2,419,272 | Marisic et al. | Apr. 22, 1947 |
| 2,456,268 | Gibbs et al. | Dec. 14, 1948 |
| 2,453,084 | Brown | Nov. 2, 1948 |
| 2,543,132 | Shabaker | Feb. 27, 1951 |
| 2,641,583 | Gring | June 9, 1953 |